United States Patent [19]

Müssig et al.

[11] Patent Number: 4,985,508
[45] Date of Patent: Jan. 15, 1991

[54] PROCESS FOR THE PRODUCTION OF POLYESTER-POLYAMIDE BLOCK POLYMERS

[75] Inventors: Bernhard Müssig, Seevetal; Rolf-Volker Meyer, Krefeld; Rolf Dhein; Bert Brassat, both of Krefeld, all of Fed. Rep. of Germany

[73] Assignee: Bayer Aktiengesellschaft, Leverkusen, Fed. Rep. of Germany

[21] Appl. No.: 336,579

[22] Filed: Apr. 11, 1989

Related U.S. Application Data

[63] Continuation of Ser. No. 41,156, Apr. 22, 1987, abandoned, which is a continuation of Ser. No. 797,933, Nov. 14, 1985, abandoned, which is a continuation of Ser. No. 676,526, Nov. 30, 1984, abandoned, which is a continuation of Ser. No. 594,722, Mar. 29, 1984, abandoned.

[30] Foreign Application Priority Data

Apr. 8, 1983 [DE] Fed. Rep. of Germany ....... 3312580

[51] Int. Cl.$^5$ ............................................. C08G 81/00
[52] U.S. Cl. .................................. 525/420.5; 525/425; 528/295.3
[58] Field of Search ............................ 525/425, 420.5; 528/295.3

[56] References Cited

U.S. PATENT DOCUMENTS

| | | | |
|---|---|---|---|
| 3,383,343 | 5/1968 | Mohajer | 528/295.3 |
| 3,464,975 | 9/1969 | Duxbury | 525/425 |
| 3,650,999 | 3/1972 | Martins | 525/425 |
| 3,849,514 | 11/1974 | Gray et al. | |
| 3,907,733 | 9/1975 | Jackson, Jr. et al. | |
| 4,115,475 | 9/1978 | Foy | 525/425 |
| 4,145,372 | 3/1979 | Murray | 525/425 |
| 4,165,303 | 8/1979 | Schlossman | 525/425 |

FOREIGN PATENT DOCUMENTS

| | | |
|---|---|---|
| 0084643 | 8/1983 | European Pat. Off. |
| 2442391 | 3/1976 | Fed. Rep. of Germany |
| 2728319 | 1/1978 | Fed. Rep. of Germany |
| 1140463 | 9/1966 | United Kingdom |

*Primary Examiner*—Patricia Short
*Attorney, Agent, or Firm*—Connolly and Hutz

[57] ABSTRACT

A process for the production of polyester-polyamide block polymers by precondensing a polyamide-forming starting mixture until a relative viscosity of at least 1.2 is attained, and adding a polyester, the dicarboxylic acid units of which are derived to at least 50% from dicarboxylic acids having at least 17 carbon atoms.

6 Claims, No Drawings

PROCESS FOR THE PRODUCTION OF POLYESTER-POLYAMIDE BLOCK POLYMERS

This application is continuation of application Ser. No. 041,156, filed Apr. 22, 1987, now abandoned, which is a continuation of application Ser. No. 797,933 filed Nov. 14, 1985 abandoned, which in turn is a continuation of application Ser. No. 676,526 filed Nov. 30, 1984, abandoned, which in turn is a continuation of application Ser. No. 594,722 filed Mar. 29, 1984, abandoned.

This invention relates to a process for the Production of polyester-polyamide block polymers, having a high dimensional stability under heat, a good processibility and a high impact strength, by pre-polymerising the polyamide-forming starting mixture until a specific minimum viscosity is attained, mixing it with a polyester and completely polycondensing the mixture.

Tough, flexible polymers which are resistant to the influence of heat and chemicals are particularly advantageous in many fields of technology. Such plastics materials, for example copolyamides, are used for example in the production of conveyor belts, and for hinges and unbreakable mountings and attachments which show improved impact stress.

Attempts have been made to incorporate polyether blocks into polyamides to improve the elasticity of polyamides (DE-A-2,712,897).

However, such block polymers are not suitable for some fields of application, because they have only a limited resistance to the influence of heat, light and weathering.

Hitherto, the attempts to incorporate polyesters into polyamides, by polycondensing the polyester in the presence of polyamide, have produced only brittle or sticky compositions, which are completely unsuitable as construction materials. If transesterification catalysts and low-boiling diols are used in excess during the polycondensation reactions and if the volatile compounds are removed in a vacuum stage, then elastic solids with having broad softening ranges are obtained, which are suitable for the production of fibres (DE-A1,620,899). On account of their poor solidification, it is impossible to produce mouldings therefrom by thermoplastic shaping.

Therefore, an object of the present invention was to prepare modified polyamides which may be processed into mouldings having high softening temperatures, a high rigidity and impact strength by thermoplastically shaping, in particular by extrusion and injection moulding.

Thus, the present invention provides a process for the production of thermoplastically processible polyamide-polyester block polymers, wherein the polyamide-forming components are prepolymerised until a relative viscosity of at least 1.2 is attained (measured on a 1 % polymer solution in m-cresol at 25° C.), preferably a relative viscosity of from 1.8 to 2.2, from 1 to 30 %, by weight, preferably from 5 to 20 %, by weight, based on the total mixture, of a polyester having a molecular weight $M_n$ of from 2,000 to 20,000, preferably from 3,500 to 15,000, are added, the dicarboxylic acid units of which are derived to at least 50 %, by weight, preferably from 80 to 100 %, by weight, from at least one aliphatic or cycloaliphatic dicarboxylic acid having at least 17 carbon atoms, and the mixture is completely polycondensed.

The polyamide-forming components are polymerised or polycondensed, according to the conventionally known method the aqueous salt solutions and/or ω-amino-carboxylic acid or the corresponding lactams being preferably polymerised hydrolytically.

Suitable polyamide-forming components include aliphatic, araliphatic and cycloaliphatic diamines having from 2 to 20 carbon atoms, preferably alkylene diamines, such as tetramethylene diamine, hexamethylene diamine, octamethylene diamine, decamethylene diamine and dodecamethylene diamine. Hexamethylene diamine is particularly suitable. Alkyl-substituted alkylene diamines, such as methyl, dimethyl and trimethyl hexamethylene diamine may also be used. Araliphatic diamines, such as m-xylene- and p-xylylene diamine and the alkyl substituted analogs thereof, are also suitable Isophorone diamine, diaminocyclohexanes and diamines corresponding to the following formula (I) are suitable as cycloaliphatic diamines.

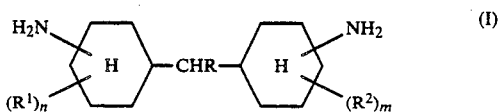

wherein
R represents H or $C_1$–$C_{18}$-alkyl, and
$R^1$ and $R^2$ each independently represent H or $C_{1-18}$-alkyl, and n and m each independently may represent an integer from 1 to 4.

Suitable polyamide-forming dicarboxylic acids include aromatic and aliphatic saturated dicarboxylic acids having from 5 to 16 carbon atoms.

Alkylene dicarboxylic acids are particularly suitable, such as glutaric, adipic, pimelic, suberic, azelaic, sebacic, undecanedicarboxylic, decanedicarboxylic, 2-methyladipic (2-methylhexane1,6-dicarboxylic acid), 3-methyladipic and 3,4-dimethyl-adipic acid.

The following are suitable as examples of aromatic dicarboxylic acids: 3,5-pyridine-dicarboxylic acid, 2,6-naphthalene, 4,4'-diphenyl, 4,4'-diphenylsulphone and benzophenone dicarboxylic acid, terephthalic acid, substituted terephthalic acids and isophthalic acid. Cycloaliphatic dicarboxylic acids, such as cyclohexane-1,4-dicarboxylic acid (hexahydroterephthalic acid) and cyclohexane diacetic acid may also be used. Adipic acid is preferably used.

Suitable ω-aminocarboxylic acids include aliphatic aminocarboxylic acids having from 5 to 13 carbon atoms and the corresponding cyclic lactams.

Those ω-aminocarboxylic acids or the lactams thereof are particularly suitable in which the alkylene group consists in each case of a chain of unsubstituted methylene groups or a chain of methylene groups in which one of the hydrogen atoms of one or more of the methylene groups is substituted by a methyl group.

Examples of such aminocarboxylic acids or lactams are as follows: 6-aminocaproic acid, 11-aminoundecanoic acid, 3-, 4-, 5- or 6-methyl-6-aminocaproic acid, caprolactam, dodecanolactam and 3-,4-, 5- or 6-methylcaprolactam. ε-Caprolactam is preferred.

Mixtures of the above-mentioned polyamideforming components are also suitable.

The polyamide blocks of the block polymers which are produced according to the present invention preferably consist of polyhexamethylene adipamide, polyhexamethylene sebacamide, dodecamethylene terephthalamide, polycaprolactam, polyamide 11, polyamide 12, polyhexamethylene-isophthalamide, polyhexamethylene dodecanamide or polytrimethylhexamethyleneterephthalamide. Polyamide-6 and polyamide-6,6 blocks are particularly preferred.

The polyesters which are used according to the present invention are distinguished in that the dicarboxylic acid component thereof consists to 50 %, by weight, preferably from 80 to 100 %, by weight, of an optionally unsaturated aliphatic or cycloaliphatic dicarboxylic acid having at least 17 carbon atoms. Such dicarboxylic acids are preferably reaction products of unsaturated fatty acids with, for example, another fatty acid or a corresponding fatty acid ester, with CO or short chain α,ε-unsaturated monocarboxylic acids; the corresponding hydrogenation products being particularly preferred in addition to the so-called dimer acids and esters thereof.

Products corresponding to the following general formula (II) are preferably suitable as reaction products of unsaturated fatty acids with CO.

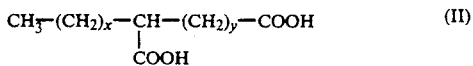

(II)

wherein x represents an integer from 1 to 15, y represents an integer from 1 to 15, and x+y represents 16, which products are described in, for example, DE-A-2,424,138 or by Reppe and Kroper, Ann. Chem. 582, 62 (1953).

Furthermore, dimerisation products of unsaturated fatty acids and α,β-unsaturated, short-chain monocarboxylic acids, preferably of acrylic acid or methacrylic acid, corresponding to the general formula (III):

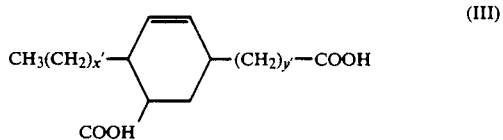

(III)

wherein x' represents an integer from 1 to 5, and y' represents an integer from 1 to 7, are also suitable, as are in particular the corresponding hydrogenated products.

Dimer acids, which are produced by the dimerisation of fatty acids and/or the esters thereof and the hydrogenation products thereof, are particularly suitable. Such compounds are described for example by J. C. Cowan and H. M. Teeter, Ind. Eng. Chem. 36, 148–152 (1944), L. F. Byrne, Reviewed Chem. Industries, p. 457–458, 4–15.61, Dudley T Moore, Paint, Oil and Chemical Review, 4.1 1951, Henry Fleming Payne, Organic Coating Technology, 1, 275–277 (1954), R. G. Kadesch, J. Amer. Oil Chemists Assoc. 31, 568–573 (1954), H. A. Witcoff and B. G. Reuben in Industrial Organic Chemicals in Perspectives Bd. I, P. 139 (Wiley Interscience, N.Y. 1980), and Condensation Monomers, published by J. K. Stille and T. W. Campbell (Wiley-Interscience, N.Y.) in the chapters "Dimer Acid" and "C₁₉ Dicarboxylic Acids". The standard products which are obtained from natural or synthetic resins, for example C₁₉-C₂₃ dicarboxylic acids as described by R. G. Kadesch, J. Amer. Oil Chemists Soc. 31, 568 (1954) and which are separated from Japan wax are also included in these dimer acids, as are the oxidation products of paraffins which may contain, in addition to hexadecane- or octadecane-dicarboxylic acids, other dimer acids, such as

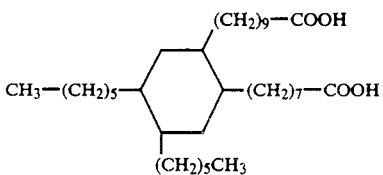

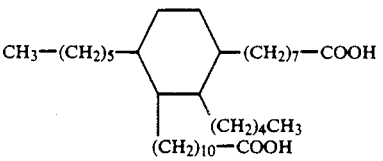

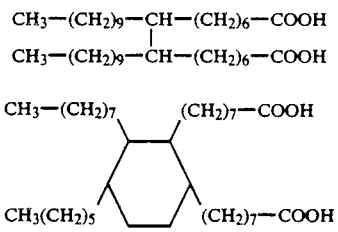

or mixtures thereof, as a commercial product.

The products which originate from natural substances may have a variable composition. Moreover, these products contain a specific proportion of mono- and tricarboxylic acids, and, in the case of the products to be used according to the present invention, the proportion of dicarboxylic acid must be above 80 % by weight, more preferably above 95 % by weight.

Hydrogenated dimerisated fatty acids are more preferably used.

Conventional polyols and optionally conventional saturated, aliphatic or aromatic dicarboxylic acids may be simultaneously used for the synthesis of the polyesters.

Polyols which are suitable, preferably diols, include alkylene or cycloalkylene glycols, the alkylene or cycloalkylene group of which preferably contains from 2 to 18 carbon atoms. Examples of such glycols are: ethylene glycol; 1,2- and 1,3-propanediol, 1,4-butane diol, neopentyl glycol, 1,5-pentanediol, 1,6-hexanediol, 1,10-decanediol, 1,4-di-(methylol)-cyclohexane, TCD-dimethanol and long-chain diols, such as commercial 12-hydroxystearyl alcohol. In particular cases, glycols containing ether groups may also be used. Diethylene glycol, triethylene glycol and polyetherdiols, as are already used for the production of polyurethane foams, are included in this respect. These polyether diols contain as units e.g. —O—(CH₂)—$_n$, wherein n represents from 1 to 5 and/or —O—CH₂—CHR₃— wherein R₃ represents C₁-C₁₈ alkyl. It is also possible to use polyester diols as the glycol component. Mixtures of the above-mentioned diols may also be used.

Aromatic and aliphatic dicarboxylic acids, preferably corresponding to the general formula (IV):

(IV), wherein

R₄ represents a (cyclo)alkylene radical having from to 5 to 14 carbon atoms or an aromatic radical having from 6 to 18 carbon atoms, are suitable as further dicarboxylic acids being additionally used.

The following are particularly suitable: alkylene dicarboxylic acids, optionally substituted with CH₃ groups, such as glutaric, adipic, pimelic, suberic, azelaic, sebacic, undecanedicarboxylic, decanedicarboxylic, 2-methyladipic (2-methylhexane-1,6-dicarboxylic acid), 3-methyl-adipic and 3,4-dimethyl-adipic acid.

3,5-pyridine dicarboxylic acid, 2,6-naphthalene, 4,4'-diphenyl, 4,4'-diphenylsulphonic and benzophenonedicarboxylic acid, terephthalic acid, substituted terephthalic acids and isophthalic acid are, for example, also suitable as aromatic dicarboxylic acids. Cycloaliphatic dicarboxylic acids, such as cyclohexane-1,4-dicarboxylic acid (hexahydroterephthalic acid) and cyclohexane-diacetic acid may also be used.

The polyesters which are used should not be branched and should have OH— and/or COOH— end groups. The type and number of chain ends may be controlled by chain-terminators (e.g. monofunctional acids or alcohols) or by branched compounds (e.g. trimethylolpropane, trimesic acid). Polyesters having carboxyl end groups are preferred. All acids which are used for the production of polyesters may also be used as polyester-forming derivatives, such as methyl or ethyl esters.

The polyesters are produced according to the conventional processes, preferably by direct esterification without entrainers. During esterification and/or transesterification, an inert gas, such as nitrogen, may be passed through the apparatus. The use of catalysts is not necessary. The molecular weight Mw of the polyesters which are obtained should be at least 2,000, whereby the processibility and the incorporation into the polyamide precondensate, must be still guaranteed. The acid number should be below 30. The Mn of the ester component should preferably be from 2,000 to 20,000, more preferably from 2,500 to 15,000 and in particular about 10,000. The average molecular weight weight is determined by analysis of the end groups.

The production of the polyester-polyamides according to the present invention is carried out in autoclaves or in precondensing pipes (so-called VK-tubes). The condensation temperature should be from 190° to 290° C., and preferably from 230° to 280° C.

The process according to the present invention is preferably carried out such that the polyamideforming components are introduced and precondensed in a known manner until a relative viscosity of at least 1.2 is reached. After addition of the polyester the mixture is preferably completely condensed at a temperature of from 250° to 280° C. The polyesterpolyamide block polymers which are thus obtained may be discharged, spun off and granulated in a conventional manner; a monomer extraction may be appropriate.

The polyester-polyamides which are produced according to the present invention have with regard to their relative viscosity, astonishingly high strengths (cold resistance and notched impact strength). Moreover, the water absorption is generally lower than that of unmodified polyamides.

The polyester-polyamides may be easily processed into injection-moulded-articles, tubes, sections, films, or monofilaments having an opalescent to transparent appearance. Moreover, their remarkable ability to be extruded easily facilitates the simple incorporation of additives and auxiliaries, such as stabilisers, processing auxiliaries, pigments, fillers, glass fibres, flameresistant additives, nucleating agents, asbestos, molybdenum sulphides, graphite glass microspheres, plasticisers, antistatic agents, hardeners, lubricants, mould-release agents or blowing agents. The polyester-polyamides according to the present invention are also suitable as blend compounds for other polymers, such as polyamides or polyalkylene terephthalates.

EXAMPLES

I. Production of the polyesters

Example A 3340 g (5.95 mols*) of dimer fatty acid (Hysterene 3695 ®) a 660 g (5.59 mols) of hexanediol-(1,6) are condensed under nitrogen in a 6 liter flask having a descending condenser with stirring for 2 h at 150° C., during which time water distills off. The mixture is further stirred at from 195° to 200° C. until the acid number 11 is reached. 6 Molecular weight is determined from the acid number or the OH number.

The product is a light-coloured oil of average viscosity, having an acid number of 10.7, an OH number of <1, a glass temperature of −58° C. (differential thermoanalysis) and a molecular weight $M_n$ of 10,500 (determination of end groups).

Example B 437 g (1.25 mols*) of a commercial 12-hydroxystearyl alcohol and 928 g (1.66 mols*) of the dimer fatty acid used in Example A are condensed as in Example A to produce a polyester. The product is a light yellow, viscous resin, having an acid number of 9, an OH number of 18, a glass temperature of −105° C. (differential thermoanalysis) and a molecular weight $M_n$ of 4100 (determination of end groups). 6 Molecular weight is determined from the acid number of the OH number.

Example C 2390 g (4.26 mols*) of a dimer fatty acid (Empol 1010 ®) and 778 g (3.97 mols) of TCD-alcohol corresponding to the idealised formula

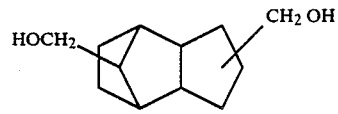

are condensed as in Example 1 to produce a polyester. The product is a light yellow resin of high viscosity having an acid number of 11, an OH number of 30, a glass temperature of −36° C. (differential thermoanalysis) and a molecular weight $M_n$ of 8800 (gel permeation chromatography "CrPC"). 6 Molecular weight is determined from the acid number or the OH number.

II. Production of the polyester polyamides

Example 1

9 kg of caprolactam and 400 g of water are stirred for 1 h at 200° C. and then for 3 h at 270° C. under their inherent pressure in a 20 liter autoclave at 20 r.p.m. and are precondensed until a relative viscosity of 1.5 is attained. Over a period of half an hour, the excess pressure is released, then nitrogen is passed over and 1 kg of the polyester resin according to Example A is added. After a condensation period of 7 h at 270° C., the product is left to settle under nitrogen for 1 h, then spun off, granulated and extracted three times With 20 kg of water, which contains 20 g of hydrazine hydrate, at from 95° to 100° C. The properties of the dried products are given in Table 1.

Examples 2 and 3

The polyester polyamides are produced as in Example 1, but the polyester resins according to Example B or Example C are used. Table 1 shows the properties of the products.

TABLE 1

|  | Example 1 A | Example 2 B | Example 3 C |
|---|---|---|---|
| Polyester |  |  |  |
| Flow length (cm)** | 52 | 47 | 100 |
| Flectural strength (mPa) (DIN 53 453) | 93.3 | 89.0 | 89.5 |
| Notched impact strength (kJ/m²) (DIN 53 453) | 9.2 | 13.0 | 5.5 |
| Notched impact strength |  |  |  |
| at −20 20 C. | 1.8 | 6.2 | 3.1 |
| at −40° C. | 1.3 | 2.1 | 1.6 |
| (kJ/m²) (DIN 53453) | 177 | 172 | 180 |
| Vicat (°C.) (DIN 53 460) |  |  |  |
| Water absorption (%) |  |  |  |
| 24 h at 60° C. | 4.32 | 4.60 | 3.55 |
| ηrel | 2.89 | 3.21 | 1.92 |

**The flow length is a measure of the flowability of a product, thus also of the processability thereof, a relatively high flow length signifies an improved flowability and thus shorter injection cycles.

The flow length is a measure of the flowability of a product, thus also of the processibility thereof; a relatively high flow length signifies an improved flowability and thus shorter injection cycles.

The flow length was determined as follows. The sample to be examined is injected into a special mould which is maintained at 90° C., under an injection pressure of 72 bars, by means of an injection moulding apparatus, the cylinder temperature of which is 260° C. Particularly easy flowing materials can fill the mould under these conditions, so that afterwards a 100 cm long spiral may be removed. Materials which do not flow as easily only partly fill the mould under the described conditions. Due to the premature solidification of the melt, only spiral bodies which are shorter than 100 cm may then be obtained.

The length in cm which was reproduced 5 times is stated as the flow length.

Comparative Experiment 1

9 kg of caprolactam and 0.4 kg of Water are condensed as in Example 1, but without the addition of a polyester. Table 2 shows the properties of the product.

Examples 4 and 5

The polyester-polyamides are produced as in Example 1. The content of polyester A is 6 or 20 %, by weight. The properties of the products are given in Table 2.

TABLE 2

| Experiment | Comparative | 4 | 5 |
|---|---|---|---|
| Ester proportion (%, by weight) | 0 | 6 | 20 |
| η rel | 3.05 | 3.00 | 2.28 |
| Flow length (cm)** | 75 | 58 | 100 |
| Notched impact strength | 2.4 | 7.0 | 9.2 |

TABLE 2-continued

| Experiment | Comparative | 4 | 5 |
|---|---|---|---|
| (kJ/m²) |  |  |  |
| Limiting bending stress (DIN 53 452) (N/mm²) | 110 | 99.4 | 62.4 |
| Water absorption (%) | 10 | 7.5 | 3.8 |

Example 6

A polyester-polyamide is produced analogously to Example 1 from caprolactam, water and polyester A, except that the polyester is added after a relative viscosity of 2.4 has been reached, and after a polycondensation time of 4 h at 270° C. Table 3 shows the properties of the product.

TABLE 3

|  | Example 6 | Example 7 |
|---|---|---|
| Ester proportion (% by weight) | 10 | 15 |
| η rel | 3.58 | 2.7 |
| Flow length (cm)** | 70 | 82 |
| Notched impact strength (kJ/m²) | 28.1 | 26.4 |
| Limiting bending strength (N/mm²) | 66.1 | — |
| Vicat B (°C.) | 180 | — |

Example 7

3.50 kg of azelaic acid and 2.68 kg of aqueous hexamethylene diamine solution (82.5 % by weight of hexamethylene diamine) are stirred for 1 hour at 200° C. under a nitrogen pressure of 2 bars. The pressure is then relaxed and the mixture is heated to 270° C. and precondensed until a relative viscosity of 2.5 is attained. 1 kg of polyester, according to Example A, is then added and the mixture is further condensed for 5 hours. The properties of the polyester polyamide are shown in Table 3.

We claim:
1. Thermoplastically processable polyamide-polyester block polymers produced by a process consisting of
(i) precondensing polyamide-forming components until a relative viscosity of at least 1.2, measured on a 1% polymer solution in meta-cresol at 25° C., is attained;
(ii) adding from 1 to 30%, by weight, based on the total mixture, of a polyester component having a molecular weight of from 2,000 to 20,000 which is the average molecular weight determined by end group analysis, and being obtained from reactants consisting of diol and dicarboxylic acid wherein the diol is selected from the groups consisting of ethylene glycol, 1,2-and 1,3-propanediol, 1,4-butane diol, neopentyl glycol, 1,5-pentanediol, 1,6-hexanedioal, 1,10-decanediol, 1,4-di-(methylol)-cyclohexane, 12-hydroxystearyl alcohol and TCD-dimethanol of the formula

and the dicarboxylic acid is selected from the group consisting of reaction products of an unsaturated fatty acid with another fatty acid or its ester, hydrogenated reaction products of an unsaturated fatty acid with another fatty acid or its ester, reaction products of an unsaturated fatty acid with CO, hydrogenated reaction products of an unsaturated fatty acid with CO, reaction products of an unsaturated fatty acid with an α,β-unsaturated monocarboxylic acid, and hydrogenated reaction products of an unsaturated fatty acid with an α,β-unsaturated monocarboxylic acid;

(iii) and then completely polycondensing the mixture.

2. A polyamide-polyester polymer as claimed in claim 1 wherein the dicarboxylic acid reactant producing component has the formula (II)

or the formula (III)

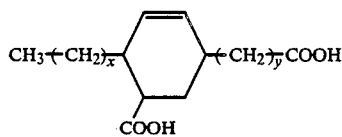

or the hydrogenated formula (III) dicarboxylic acid, wherein x is an integer from 1 to 15,
x' is an integer from 1 to 5,
y is an integer from 1 to 15,
y' is an integer from 1 to 7, and the sum of x and y is 16.

3. A polyamide-polyester polymer as claimed in claim 1 wherein the polyester component producing the block polymer has carboxyl end groups.

4. A polyamide-polyester polymer as claimed in claim 1 wherein the polyester component producing the block polymer is the reaction product of a dimer fatty acid and 1,6-hexane diol.

5. A polyamide-polyester polymer as claimed in claim 1 wherein the polyester component producing the block polymer is the reaction product of a dimer fatty acid and 12-hydroxystearyl alcohol.

6. A polyamide-polyester polymer as claimed in claim 1 wherein the polyester component producing the block polymer is the reaction product of a dimer fatty acid and a diol of the formula

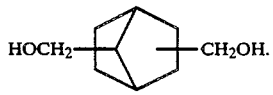

* * * * *